(12) United States Patent
van der Merwe et al.

(10) Patent No.: US 11,118,535 B2
(45) Date of Patent: Sep. 14, 2021

(54) REVERSING GEAR ASSEMBLY FOR A TURBO MACHINE

(71) Applicant: General Electric Company, Schenectady, NY (US)

(72) Inventors: Gert Johannes van der Merwe, Lebanon, OH (US); Raymond Floyd Martell, Wyoming, OH (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 16/292,642

(22) Filed: Mar. 5, 2019

(65) Prior Publication Data

US 2020/0284223 A1 Sep. 10, 2020

(51) Int. Cl.
  *F02K 3/072* (2006.01)
  *F02C 3/067* (2006.01)
  *F02C 7/36* (2006.01)

(52) U.S. Cl.
  CPC .............. *F02K 3/072* (2013.01); *F02C 3/067* (2013.01); *F02C 7/36* (2013.01); *F05D 2260/4031* (2013.01)

(58) Field of Classification Search
  CPC .. F02K 3/072; F02C 3/067; F02C 7/36; F02C 7/073; F01D 1/24; F04D 29/024; F05D 2260/4031
  See application file for complete search history.

(56) References Cited

U.S. PATENT DOCUMENTS

| | | | |
|---|---|---|---|
| 2,478,206 A | 8/1949 | Redding | |
| 3,546,880 A | 12/1970 | Schwaar | |
| 3,861,139 A | 1/1975 | Jones | |
| 4,005,575 A | 2/1977 | Scott et al. | |
| 4,296,599 A | 10/1981 | Adamson | |
| 4,621,978 A | 11/1986 | Stuart | |
| 4,909,031 A | 3/1990 | Grieb | |
| 4,947,642 A | 8/1990 | Grieb et al. | |
| 5,079,916 A | 1/1992 | Johnson | |
| 5,272,868 A | 12/1993 | Ciokajlo et al. | |
| 6,391,948 B1 | 5/2002 | Clark et al. | |
| 6,619,030 B1 | 9/2003 | Seda et al. | |

(Continued)

FOREIGN PATENT DOCUMENTS

| | | |
|---|---|---|
| DE | 3933776 A1 | 4/1991 |
| DE | 10241608 | 7/2006 |

(Continued)

OTHER PUBLICATIONS

U.S. Appl. No. 15/621,496, filed Jun. 13, 2017.
U.S. Appl. No. 15/710,261, filed Sep. 20, 2017.
U.S. Appl. No. 15/710,123, filed Sep. 20, 2017.

*Primary Examiner* — Justin D Seabe
*Assistant Examiner* — Ryan C Clark
(74) *Attorney, Agent, or Firm* — Dority & Manning, P.A.

(57) ABSTRACT

A thrust balancing gear assembly for a turbo machine is provided. The gear assembly includes an input gear connected to an input drive shaft, an output gear connected to an output drive shaft, and a compound planet gear including a first planet gear and a second planet gear each connected to one another and positioned in axially adjacent arrangement. The first planet gear is connected to the input gear at a first interface and the second planet gear is connected to the output gear at a second interface.

20 Claims, 2 Drawing Sheets

(56) References Cited

U.S. PATENT DOCUMENTS

| | | |
|---|---|---|
| 6,752,034 B2 | 6/2004 | Huber et al. |
| 6,763,654 B2 | 7/2004 | Orlando et al. |
| 7,186,073 B2 | 3/2007 | Orlando et al. |
| 7,195,446 B2 | 3/2007 | Seda et al. |
| 7,269,938 B2 | 9/2007 | Moniz et al. |
| 7,290,386 B2 | 11/2007 | Orlando et al. |
| 7,296,398 B2 | 11/2007 | Moniz et al. |
| 7,334,981 B2 | 2/2008 | Moniz et al. |
| 7,451,592 B2 | 11/2008 | Taylor et al. |
| 7,513,103 B2 | 4/2009 | Orlando et al. |
| 7,594,388 B2 | 9/2009 | Cherry et al. |
| 7,882,693 B2 | 2/2011 | Schilling |
| 7,926,259 B2 | 4/2011 | Orlando et al. |
| 8,008,798 B2 | 8/2011 | Jansen et al. |
| 8,083,030 B2 | 12/2011 | Portlock |
| 8,191,352 B2 | 6/2012 | Schilling |
| 8,276,362 B2 | 10/2012 | Suciu et al. |
| 8,402,742 B2 | 3/2013 | Roberge et al. |
| 8,756,908 B2 | 6/2014 | Sheridan et al. |
| 8,876,462 B2 | 11/2014 | Balk et al. |
| 8,951,012 B1 * | 2/2015 | Santoro ................. F04D 19/007 416/128 |
| 8,997,500 B2 | 4/2015 | Glahn et al. |
| 9,011,076 B2 | 4/2015 | Suciu et al. |
| 9,017,028 B2 | 4/2015 | Fabre |
| 9,022,725 B2 * | 5/2015 | Merry ..................... F01D 15/12 415/69 |
| 9,028,200 B2 | 5/2015 | Suciu et al. |
| 9,074,485 B2 | 7/2015 | Suciu et al. |
| 9,080,512 B2 * | 7/2015 | Suciu ..................... F02C 3/067 |
| 9,169,781 B2 * | 10/2015 | McCune ................. F02K 3/072 |
| 9,194,290 B2 | 11/2015 | Suciu et al. |
| 9,647,367 B1 | 5/2017 | Emaci et al. |
| 9,745,860 B1 * | 8/2017 | Haskin .................... F01D 15/12 |
| 9,765,853 B2 | 9/2017 | Robuck et al. |
| 2005/0226720 A1 | 10/2005 | Harvey et al. |
| 2008/0184694 A1 | 8/2008 | Guimbard et al. |
| 2013/0219859 A1 | 8/2013 | Suciu et al. |
| 2014/0206496 A1 * | 7/2014 | McCune ................... F16H 1/28 475/331 |
| 2014/0241856 A1 | 8/2014 | Roberge et al. |
| 2015/0078888 A1 | 3/2015 | Golshany et al. |
| 2015/0152783 A1 | 6/2015 | Acquisti |
| 2015/0354502 A1 * | 12/2015 | Kuhne ...................... F02C 7/36 60/226.1 |
| 2016/0084352 A1 | 3/2016 | Regenscheit |
| 2016/0146112 A1 * | 5/2016 | Van der Merwe ........ F02C 7/32 475/331 |
| 2016/0195010 A1 | 7/2016 | Roberge |
| 2016/0222975 A1 | 8/2016 | Sheridan et al. |
| 2016/0333734 A1 | 11/2016 | Dowden et al. |
| 2017/0191548 A1 * | 7/2017 | Fisher ...................... F02C 7/36 |
| 2017/0198605 A1 | 7/2017 | Vielcanet et al. |
| 2018/0223732 A1 | 8/2018 | Clements et al. |
| 2018/0320632 A1 | 11/2018 | Clements et al. |

FOREIGN PATENT DOCUMENTS

| | | |
|---|---|---|
| DE | 102009002658 A1 | 10/2010 |
| GB | 1476248 A | 6/1977 |
| WO | WO2012/104049 A2 | 8/2012 |

\* cited by examiner

REVERSING GEAR ASSEMBLY FOR A TURBO MACHINE

FIELD

The present subject matter relates to counter-rotating gear assemblies for turbo machines.

BACKGROUND

Indirect drive turbine engines include gear assemblies between the fan or propeller and the turbine such as to enable each of the fan and the turbine to rotate at different, higher efficiency speeds relative to one another. However, inefficiencies in gear assemblies may obviate fan and turbine speed efficiency improvements, such as via mechanical and thermal losses at the plurality of gears of the gear assembly. As such, there is a need for an improved efficiency gear assembly for a turbine engine.

BRIEF DESCRIPTION

Aspects and advantages of the invention will be set forth in part in the following description, or may be obvious from the description, or may be learned through practice of the invention.

An aspect of the present disclosure is directed to a thrust balancing gear assembly for a turbo machine. The gear assembly includes an input gear connected to an input drive shaft, an output gear connected to an output drive shaft, and a compound planet gear. The compound planet gear includes a first planet gear and a second planet gear each connected to one another and positioned in axially adjacent arrangement. The first planet gear is connected to the input gear at a first interface and the second planet gear is connected to the output gear at a second interface.

In various embodiments, each of the input gear, the output gear, the first planet gear, and the second planet gear defines a helical gear mesh arrangement. In one embodiment, the input gear and the first planet gear together define at the first interface the helical gear mesh at a first helix angle. In another embodiment, the output gear and the second planet gear together define at the second interface the helical gear mesh at a second helix angle opposite of the first helix angle.

In one embodiment, the input gear defines a sun gear.

In another embodiment, the output gear defines a ring gear.

In yet another embodiment, the input gear and the first planet gear are directly connected to one another at the first interface.

In still another embodiment, the output gear and the second planet gear are directly connected to one another at the second interface.

In various embodiments, the input gear is concentric to an axial centerline axis of the gear assembly. In one embodiment, the gear assembly includes a plurality of compound planet gears connected to the input gear in circumferential arrangement relative to the axial centerline axis.

In another embodiment, the first planet gear and the second planet gear are each coupled together in axially adjacent arrangement by a spindle.

Another aspect of the present disclosure is directed to a turbo machine. The turbo machine includes a first turbine assembly rotatable in a first direction at a first speed and a second turbine assembly rotatable in a second direction at a second speed different from the first speed, in which the second direction is opposite of the first direction. The turbo machine further includes an input drive shaft drivingly connected to the first turbine assembly, an output drive shaft drivingly connected to the second turbine assembly, and a gear assembly. The gear assembly includes an input gear connected to the input drive shaft, an output gear connected to the output drive shaft, and a compound planet gear. The compound gear includes a first planet gear and a second planet gear each connected to one another and positioned in axially adjacent arrangement. The first planet gear is connected to the input gear at a first interface and the second planet gear is connected to the output gear at a second interface.

In various embodiments, each of the input gear, the output gear, the first planet gear, and the second planet gear defines a helical gear mesh arrangement. In one embodiment, the input gear and the first planet gear together define at the first interface the helical gear mesh at a first helix angle. In another embodiment, the output gear and the second planet gear each define different pitch diameters relative to one another. In still another embodiment, the input gear defines a sun gear. In still yet another embodiment, the output gear defines a ring gear.

In one embodiment, the input gear and the first planet gear are directly connected to one another at the first interface.

In another embodiment, the output gear and the second planet gear are directly connected to one another at the second interface.

In still another embodiment, the turbo machine further includes a fan assembly connected to the output drive shaft, in which the fan assembly is rotatable in the second direction at the second speed of the second turbine assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
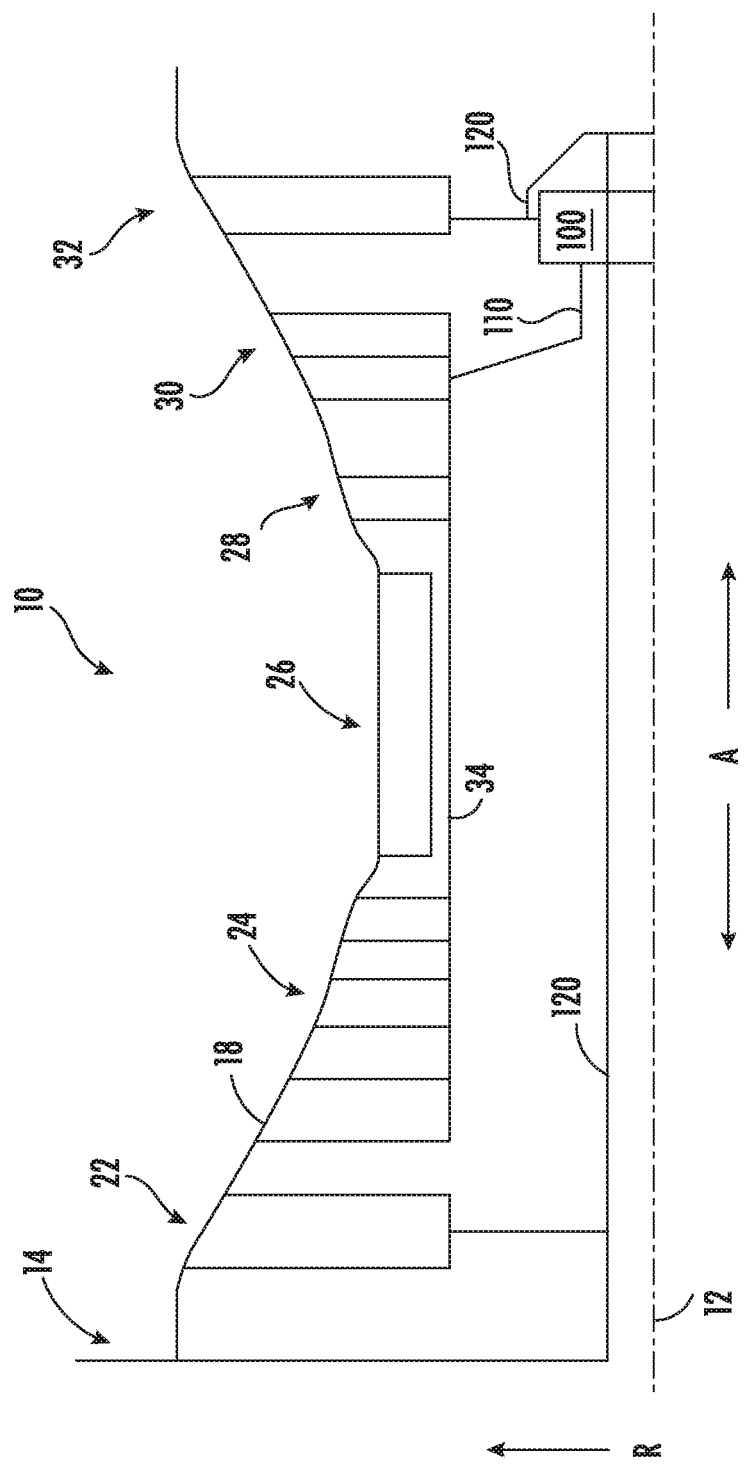
FIG. 1 is an exemplary schematic layout embodiment of a turbo machine including a gear assembly according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Referring now to the drawings, FIG. 1 is a schematic view of a turbo machine 10 (hereinafter, "engine 10") including embodiments of a thrust balancing gear assembly 100 according to aspects of the present disclosure. Embodiments of the gear assembly 100 herein provide an improved gear assembly for a counter-rotating turbine engine such as schematically depicted in FIG. 1. Still further, embodiments of the gear assembly 100 provided herein improve thrust balance in counter-rotating engines in which one or more turbines is not coupled directly to a corresponding compressor.

The engine 10 includes, in serial flow order along an axial direction A, a fan assembly 14, a low pressure (LP) compressor 22, a high pressure (HP) 24 compressor, a combustion section 26, a HP turbine 28, a first turbine 30, and a second turbine 32. An outer casing 18 may substantially cover the compressors 22, 24, the combustion section 26, and the turbines 28, 30, 32 such as to define a core flowpath therewithin. The HP turbine 28 is drivingly coupled to the HP compressor 24 via an axially extended HP shaft 34. A reference axial centerline axis 12 is disposed through the engine 10 along the axial direction A, around which the compressors 22, 24, shafts, 110, 120 and the turbines 28, 30, 32 rotate. A reference radial direction R is extended from the axial centerline axis 12.

The engine 10 includes the gear assembly 100 radially inward of the turbines 28, 30, 32, or generally aft or downstream of the combustion section 26. The gear assembly 100 receives input power and torque from an input shaft 110 drivingly connected to the first turbine 30. The gear assembly 100 is further connected to an output shaft 120 drivingly connected to the second turbine 32. Power and torque transfer from the first turbine 30 through the gear assembly 100 to the output shaft 120. Additionally, power and torque are extracted from the second turbine 32 and transmitted through the output shaft 120 with power and torque from the input shaft 110 via the gear assembly 100.

The output shaft 120 extends from the gear assembly 100 along an axial direction A to drive the fan assembly 14. In various embodiments, the output shaft 120 further drives the LP compressor 22. It should be appreciated that the first turbine 30 is not coupled directly to a compressor assembly. In other words, to the extent that the first turbine 30 is coupled to the compressors, it is via the serial power arrangement of the first turbine 30, the input shaft 110, the gear assembly 100, and the output shaft 120.

The first turbine 30 and the second turbine 32 are each in counter-rotating arrangement, such that the first turbine 30, and the input shaft 110 coupled thereto, rotates in a first direction 91 opposite of the second turbine 32, and the output shaft 120 coupled thereto, rotating in a second direction 92. The first turbine 30 is rotatable at a first speed higher than the second turbine 32 rotatable at a second speed. The fan assembly 14 is further rotatable at the second speed of the second turbine 32 along the second direction 92. The fan assembly 14 rotating at the lower second speed is enabled to operate more efficiently while the first turbine 30 is rotatable at the higher first speed that is more efficient for the first turbine 30.

It should be appreciated that the counter-rotating arrangement of the turbines 30, 32 provides an improved efficiency of the engine 10 via desirable velocity relationships of air flowing through each respective turbine 30, 32.

In various embodiments, each of the first turbine 30 and the second turbine 32 may define low pressure turbine assemblies. Alternatively, the first turbine 30 may be referred to as an intermediate pressure turbine assembly. Still further, the HP turbine 28 may be referred to as a high speed turbine assembly, the first turbine 30 may be referred to as an intermediate speed turbine assembly, and the second turbine 32 may be referred to as a low speed turbine assembly.

Figure 2:
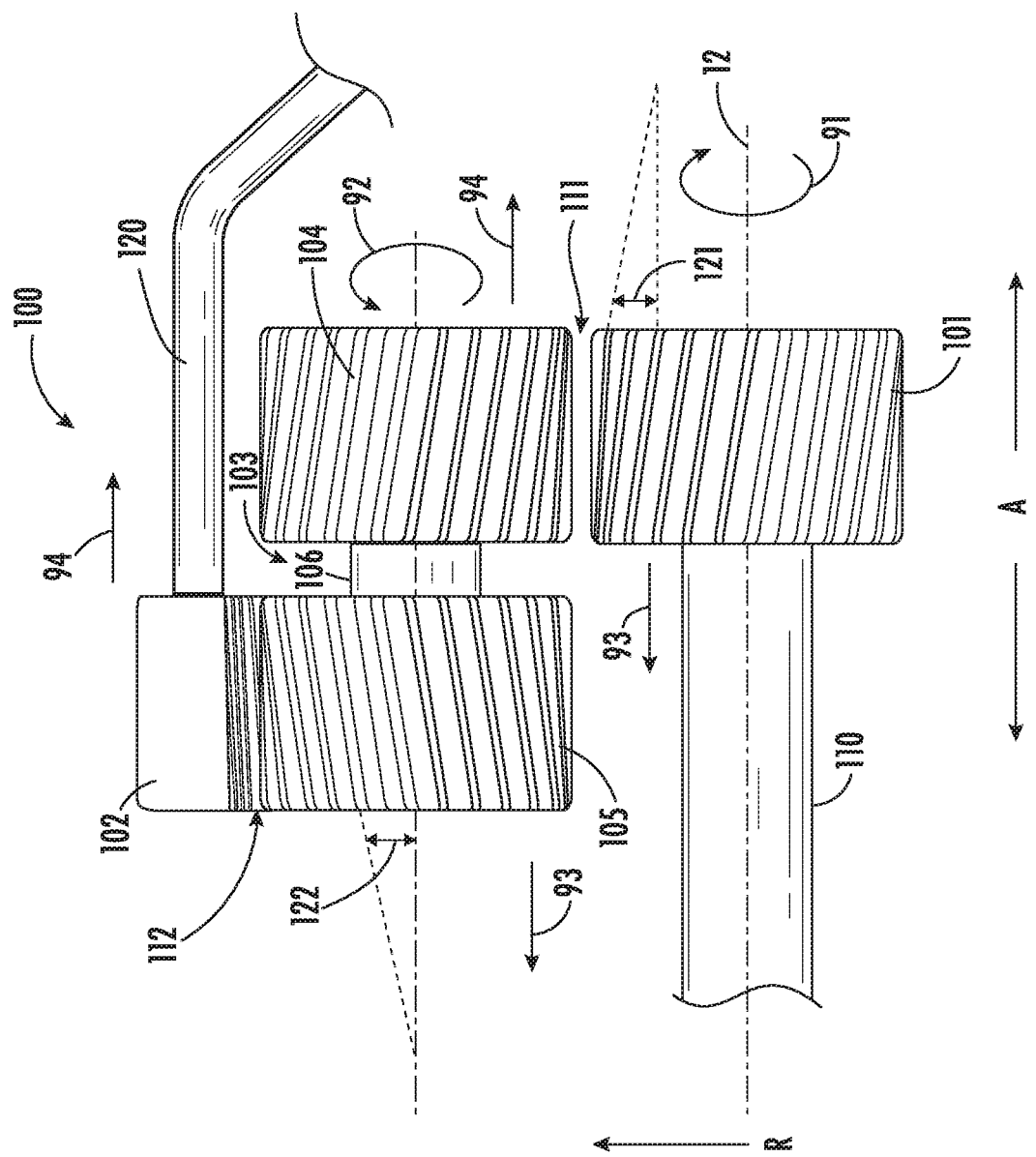
FIG. 2 is an exemplary schematic layout embodiment of the gear assembly of FIG. 1.

Referring now to FIG. 2, a partially exploded view of a portion of the thrust balancing gear assembly 100 is provided. The gear assembly 100 includes an input gear 101 connected to the input drive shaft 110. An output gear 102 is connected to the output drive shaft 120. A compound planet gear 103 including a first planet gear 104 and a second planet gear 105 are each connected to one another via an axially extended spindle 106 such as to position the first planet gear 104 and the second planet gear 105 in axially adjacent arrangement relative to each other. The first planet gear 104 is connected to the input gear 101 at a first interface 111 (partially exploded for clarity). The second planet gear 105 is connected to the output gear 102 at a second interface 112 (partially exploded for clarity). It should be appreciated that although the view provided in FIG. 2 is partially exploded, in various embodiments the input gear 101 is directly connected to the first planet gear 104 at the first interface 111. Similarly, the output gear 102 is directly connected to the second planet gear 105 at the second interface 112.

In various embodiments, each of the input gear 101, the output gear 102, the first planet gear 104, and the second planet gear 105 defines a helical gear mesh arrangement. The input gear 101 and the first planet gear 104 together define at the first interface 111 the helical gear mesh at a first helix angle 121, such as depicted schematically relative to the axial centerline axis 12. The output gear 102 and the second planet gear 105 together define at the second interface 112 the helical gear mesh at a second helix angle 122 different from the first helix angle 121. In various embodiments, the second helix angle 122 is opposite of the first helix angle 121. In still various embodiments, the second helix angle 122 is tuned to substantially load-match or otherwise thrust balance between the first planet gear 104 and the second planet gear 105. In one further embodiment, the first planet gear 104 and the second planet gear 105 each define different pitch diameters relative to one another. The different pitch diameters between the planet gears 104, 105 may further enable assembly of the gear assembly 100. In another embodiment, the second helix angle 122 is offset from the first helix angle 121 between 90 degrees and 270 degrees relative to the axial centerline axis 12. In yet another embodiment, the second helix angle 122 is approximately 180 degrees offset from the first helix angle 121 relative to the axial centerline axis 12.

In still various embodiments, the input gear 101 defines a sun gear. In one embodiment, the input gear 101 defining the sun gear is concentric to the axial centerline axis 12 such that a centerline axis of the input gear 101 is co-axial to the axial centerline axis 12. The input gear 101 rotates relative to the axial centerline axis 12.

In another embodiment, the gear assembly 100 includes a plurality of compound planet gears 103 connected to the input gear 101 in circumferential arrangement relative to the axial centerline axis 12. The plurality of compound planet gears 103 may be in fixed circumferential arrangement relative to the axial centerline axis 12.

In yet another embodiment, the output gear 102 defines a ring gear connected directly to the second planet gear 105 of the compound planet gear 103.

Embodiments of the gear assembly 100 provided herein may be manufactured via one or more processes known in the art, such as, but not limited to, forging, casting, and machining processes, additive manufacturing or 3D printing processes, or other material additive or material removal processes. The gear assembly 100 is further manufactured via one or more materials suitable for gear assemblies generally, or more particularly, gear assemblies for turbo machines, including turbofan, turboprop, turbojet, turboshaft, prop fan, or other turbo machine configurations of the engine 10 schematically provided herein.

The gear assembly 100 provided herein provides improved efficiency, decreased power and torque transfer losses, and improved durability by reducing thrust bearing size and loading. Additionally, or alternatively, the gear assembly 100 provides improved performance of a counter-rotating turbine engine by mitigating thrust balance issues resulting from a first turbine (e.g., first turbine assembly 30 in FIG. 1) being uncoupled to a corresponding compressor. The gear assembly 100 provided herein utilizes the gear mesh (i.e., first interface 111, second interface 112) to offset turbine thrust load imbalance.

For example, referring to FIG. 2, during operation of the engine 10, the first turbine 30 may generate loads along a first axial direction 93. The input gear 101 connected to the first planet gear 104 at the first interface 111 creates a balancing reactive load along a second axial direction 94 opposite of the first axial direction 93. As another example, the second turbine 32 may generate loads along the second direction 94. The output gear 102 connected to the second planet gear 105 at the second interface 112 creates a balancing reactive load along the first axial direction 93 opposite of the second axial direction 94.

Still further, the offset turbine thrust load enables a smaller thrust bearing size for engines including one or more turbines not coupled directly to a corresponding compressor. Additionally, or alternatively, embodiments of the gear assembly 100 provided herein may obviate the need for balance pistons, or significantly reduce fluid flows thereto, thereby mitigating leakages that result in performance losses at the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A thrust balancing gear assembly for a turbo machine, the turbo machine defining an axial direction, the gear assembly comprising:
an input gear connected to an input drive shaft;
an output gear connected to an output drive shaft; and
a compound planet gear comprising a first planet gear and a second planet gear each connected to one another and positioned in axially adjacent arrangement, wherein the first planet gear is distanced from the output gear along the axial direction, the first planet gear being connected to the input gear at a first interface, and the second planet gear is distanced from the input gear along the axial direction, the second planet gear being connected to the output gear at a second interface.

2. The gear assembly of claim 1, wherein each of the input gear, the output gear, the first planet gear, and the second planet gear defines a helical gear mesh arrangement.

3. The gear assembly of claim 2, wherein the input gear and the first planet gear together define at the first interface the helical gear mesh at a first helix angle.

4. The gear assembly of claim 3, wherein the output gear and the second planet gear together define at the second interface the helical gear mesh at a second helix angle opposite of the first helix angle.

5. The gear assembly of claim 1, wherein the input gear defines a sun gear.

6. The gear assembly of claim 1, wherein the output gear defines a ring gear.

7. The gear assembly of claim 1, wherein the input gear and the first planet gear are directly connected to one another at the first interface.

8. The gear assembly of claim 1, wherein the output gear and the second planet gear are directly connected to one another at the second interface.

9. The gear assembly of claim 1, wherein the input gear is concentric to an axial centerline axis of the gear assembly.

10. The gear assembly of claim 9, wherein the gear assembly comprises a plurality of compound planet gears connected to the input gear in circumferential arrangement relative to the axial centerline axis.

11. The gear assembly of claim 1, wherein the first planet gear and the second planet gear are each coupled together in axially adjacent arrangement by a spindle.

12. A turbo machine, the turbo machine defining an axial direction, the turbo machine comprising:
a first turbine assembly rotatable in a first direction at a first speed;
a second turbine assembly rotatable in a second direction at a second speed different from the first speed, wherein the second direction is opposite of the first direction;
an input drive shaft drivingly connected to the first turbine assembly;
an output drive shaft drivingly connected to the second turbine assembly; and
a gear assembly, wherein the gear assembly comprises;
an input gear connected to the input drive shaft;
an output gear connected to the output drive shaft; and
a compound planet gear comprising a first planet gear and a second planet gear each connected to one another and positioned in axially adjacent arrangement, wherein the first planet gear is distanced from the output gear along the axial direction, the first planet gear being connected to the input gear at a first interface, and the second planet gear is distanced from the input gear along the axial direction, the second planet gear being connected to the output gear at a second interface.

13. The turbo machine of claim 12, wherein each of the input gear, the output gear, the first planet gear, and the second planet gear defines a helical gear mesh arrangement.

14. The turbo machine of claim 13, wherein the input gear and the first planet gear together define at the first interface the helical gear mesh at a first helix angle.

15. The turbo machine of claim 13, wherein the output gear and the second planet gear together define at the second interface the helical gear mesh at a second helix angle.

16. The turbo machine of claim 12, wherein the input gear defines a sun gear.

17. The turbo machine of claim 12, wherein the output gear defines a ring gear.

18. The turbo machine of claim 12, wherein the input gear and the first planet gear are directly connected to one another at the first interface.

19. The turbo machine of claim 12, wherein the output gear and the second planet gear are directly connected to one another at the second interface.

20. The turbo machine of claim 12, further comprising:
a fan assembly connected to the output drive shaft, wherein the fan assembly is rotatable in the second direction at the second speed of the second turbine assembly.

* * * * *